April 13, 1943.　　　J. S. SMITH ET AL　　　2,316,370
TRANSFORMER
Filed Jan. 5, 1940
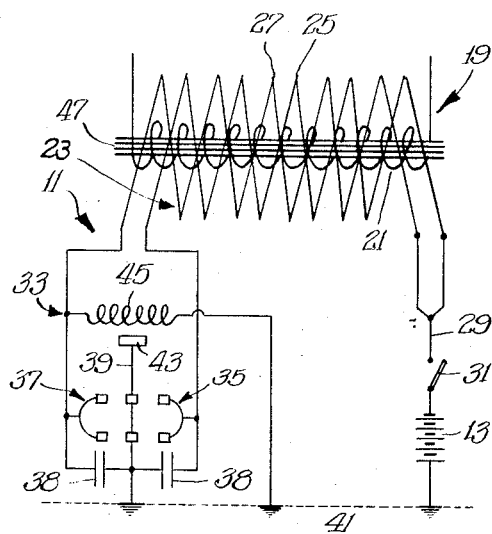
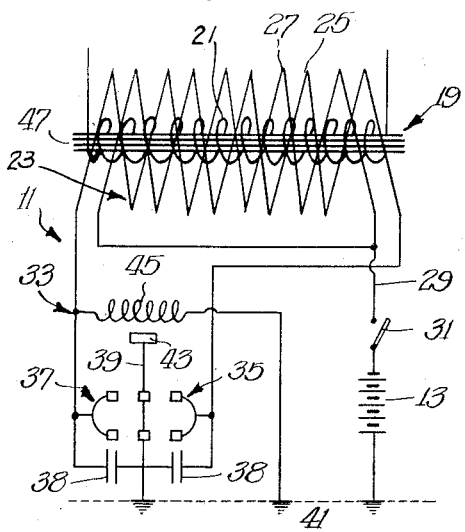
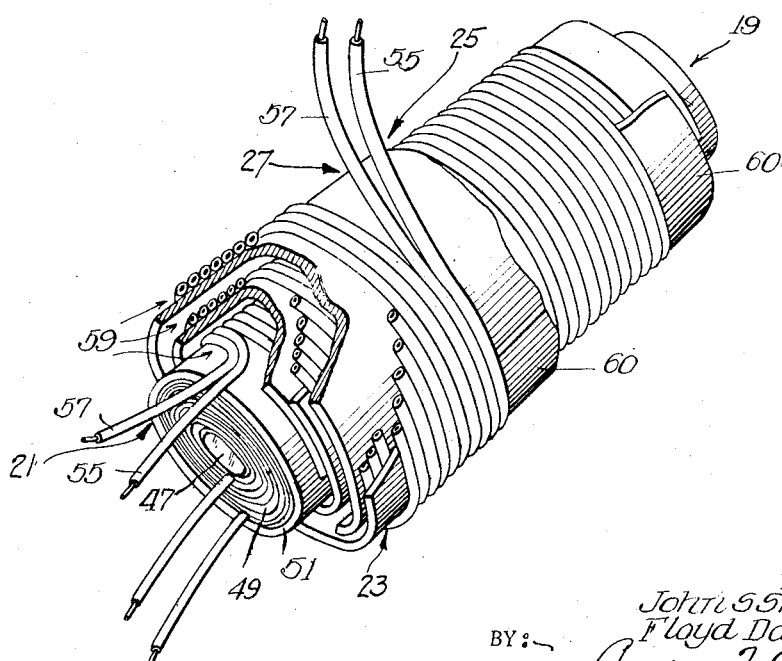
INVENTORS.
John S. Smith,
Floyd Dawson
BY Junius F. Cook, Jr.
ATTORNEY Patented Apr. 13, 1943

2,316,370

UNITED STATES PATENT OFFICE 2,316,370

TRANSFORMER

John S. Smith, Hazel Crest, and Floyd Dawson, Chicago Heights, Ill., assignors to David L. Tressler, as trustee Application January 5, 1940, Serial No. 312,482

1 Claim. (Cl. 175—356)

Our invention relates in general to electrical apparatus and has more particular reference to an improved electro-magnetic transformer particularly well suited for use in electrical power conversion systems.

An important object is to provide improved means adapted to be energized from a uni-directional electrical power source of relatively low potential for the delivery of electrical energy at high potential.

Another important object is to provide an improved power transformer; a further object being to provide a transformer particularly well suited for delivering electrical power at relatively high potential from a power source of relatively low potential, said transformer means having low potential portions arranged in novel fashion permitting the power transformation to be accomplished at maximum efficiency.

Another important object is to provide a power transformer having a high potential winding and a plurality of low potential windings inductively coupled with the high potential winding, said low potential windings comprising conductor coils arranged in parallel interspaced relationship, whereby the transformer is of minimum over-all size and wherein the inductive relation between each of said low potential windings and the high potential winding is substantially identical so as to permit the device to be used at maximum efficiency in a full wave rectifier.

Another object of the invention resides in the manner of applying low potential windings in a transformer device by winding the several conductors forming the low potential windings in such a way that the corresponding portions of each of said windings are parallel and immediately adjacent to each other.

These and numerous other objects, advantages, and inherent functions of the invention will be apparent from the following description, which, taken in connection with the accompanying drawing, discloses a preferred form of the invention.

Referring to the drawing:

Figures 1 and 2 are diagrammatic representations of electrical systems embodying a transformer containing our present invention; and Figure 3 is a perspective view illustrating the construction and method of making a transformer unit in accordance with the present invention.

To illustrate our invention, we have shown on the drawing an electrical system 11 comprising means for delivering electrical energy at relatively high potential by transforming energy derived from a relatively low potential source 13, said system including a transformer 19 embodying the present invention. It will be obvious, however, that the invention is not necessarily restricted in all of its aspects to the transformation of energy from low to high potential, but that the transformer 19 may have general application other than in the particular system herein shown and described.

In the system shown, however, the power source 13 may comprise a storage battery of the character usually employed in automotive vehicles for ignition, lighting, and for energizing electrical equipment as, for instance, a radio receiver, ventilating fan, horn and the like, forming a part of the vehicle equipment.

The transformer 19 has a high potential winding 21 and low potential windings 23 preferably comprising a plurality of sections 25, 27 inductively coupled with the winding 21, the coupling between the winding 21 and the sections 25 and 27 being substantially identical. In the illustrated embodiment the sections 25, 27 of the low potential windings are connected together at one end as at 29 and, through a suitable control switch 31, to one side of the power source 13. The opposite ends of the winding sections 25 and 27 are connected respectively to the stationary contacts 35 and 37 of a circuit changer 33 which is preferably a vibrator having, in addition to the stationary contacts 35 and 37, a reed 39 suitably anchored in position to oscillate between the stationary contacts 35 and 37 and alternately engage the same. The reed 39 may be, and preferably is, anchored at one end and electrically connected in any suitable manner, as indicated at 41, with the power source 13, this connection 41 being preferably accomplished by grounding the anchored end of the reed and grounding the side of the power source 13 opposite from the switch 31. The reed is also provided with an armature 43 in position to be influenced by an actuating coil 45 which in turn is connected in any suitable manner, as between one of the stationary contact sets and the power source 13, in order that the coil 45 may be periodically energized, by connection with the power source, and de-energized as a result of the vibration of the reed. In the illustrated embodiment, the reed actuating coil 45 is connected between the stationary contact set 37 and the connection 41.

The reed 39 is preferably positioned so that the armature 43 is normally offset with respect to the coil 45 so that, when the apparatus is at rest, the reed engages and makes electrical contact with one or other of the stationary contact sets 35, 37, thus placing one of the windings 25, 27 in circuit with the power source 13. Preferably, the reed 39 is thus biased to engage the contact set which is not connected with the coil 45, i. e., the contact set 35 in the illustrated embodiment. Upon closure of the switch 31, a surge of electrical current will take place through the low potential winding section 25 thus placed in circuit with the power source. At the same instant the coil 45 will be energized in a direction to draw the reed 39 out of engagement with the contact set 35 and project the same into engagement with the contact set 37. It will be noted that the winding section 27 is at all times in circuit with the power source 13 through the winding 45. However, this winding 45 is of relatively high resistance, so that little current may flow initially through the winding section 27. As soon as the reed 39 disengages the contact set 35, current flow through the winding section 25 will be discontinued. When the reed engages the contact set 37, however, the high resistance winding 45 will be short-circuited and a relatively large flow of current will be permitted to flow through the winding section 27. As soon as the reed 39 engages the contact set 37, the coil 45 is short circuited and becomes deenergized, thereby releasing the armature 43 so that the reed, under its normal bias, may return toward the contact set 35, thus disengaging the contact set 37 and discontinuing the relatively large current flow in the winding section 27. In this manner a relatively large current flow may be initiated alternately through the winding sections 25 and 27 which, due to the inductive relationship between said winding sections and the winding 21, will result in the development of relatively high alternating or fluctuating potential between the opposite ends of the winding 21. A condenser 38 may be connected between each of the contact sets 35 and 37 and the reed 39 to reduce arcing at the contacts as the circuits are interrupted.

The development of the relatively high value alternating potential may be accomplished by connecting the low voltage winding sections 25, 27 in other than the manner illustrated. For example, in Figure 2 of the drawing, we have illustrated a modified wiring diagram wherein one end of the winding section 27 is connected together with the opposite end of the winding section 25, said interconnected ends being connected through the switch 31 with the power source 13. In this arrangement, the free end of the winding section 27 is connected with the stationary contact set 37, while the opposite free end of the winding section 25 is connected with the stationary contact sets 35. The alternating frequency of the potential developed in the winding 21 in the arrangement shown in Figure 1 will be approximately double the alternating frequency produced from the arrangement shown in Figure 2, assuming that the vibrating period of the reed 39 is the same in both arrangements. The amplitude of the alternating potential developed from the arrangement shown in Figure 1, however, will be somewhat less than that of alternating potential developed from the arrangement shown in Figure 2.

One of the features of the power transforming system 11 resides in the construction of the transformer 19. This transformer comprises a core 47 of any suitable or preferred form upon which the high potential winding 21 is arranged, preferably as a plurality of layers 49 suitably insulated from each other and from the core 47. A layer of insulation 51 is preferably applied upon the winding 49 and the low potential winding sections 25, 27 are applied outwardly of said layer of insulation 51. The sections 25, 27 each comprise an electrical conductor, the section 25 comprising the conductor 55 and the section 27 comprising a conductor 57. These conductors are arranged in parallel adjacent relationship and so wound together in place, as clearly illustrated in Figure 3 of the drawing. Each of the corresponding portions of the conductors 55, 57 occupies parallel adjacent positions, and the inductive relationship of both sections 25 and 27, with respect to the high potential winding 21, is substantially identical. The conductors 55, 57 may be arranged to form a plurality of layers 59, as clearly shown in Figure 3 of the drawing, each layer insulated from the other by insulation 60.

It will thus be seen that the winding sections 25 and 27 have substantial identical inductive relationship with the winding 21 and with each other. Consequently, the wave portions induced in the winding 21 by the winding 25 will be substantially identical with the wave portion induced by the winding 27. Likewise, if employed as a step down transformer, substantially identical wave forms may be generated in the windings 25 and 27 by energizing the winding 21. In this respect, the invention is not necessarily restricted to low potential primary winding sections, but the invention embraces a plurality of high potential winding sections having substantially identical inductive coupling with a low potential winding.

In the illustrated embodiment, the transformer is arranged in the system to deliver alternating current at high potential between the ends of the winding 21, but, of course, the winding 21 may be associated with rectifying means if it be desired to obtain uni-directional power at high potential.

While the winding 21 is shown wound upon the core 47, with the windings 25 and 27 in overlying relationship, it is obvious that the invention is not necessarily restricted to such relationship but embraces any arrangement in which corresponding portions of the several sections of one winding have identical relationship with the other winding.

Various useful applications of the transformer herein disclosed will be suggested, and it should be obvious that the invention is not necessarily limited to the use of the transformer in any particular combination.

It is thought that the invention and its numerous attendant advantages will be fully understood from the foregoing description, and it is obvious that numerous changes may be made in the form, construction and arrangement of the parts without departing from the spirit or scope of the invention or sacrificing its attendant advantages, the form herein described being a preferred embodiment for the purpose of exemplifying our invention.

The invention is hereby claimed as follows:

A transformer comprising a winding and a plurality of separate coils inductively coupled with said winding, said coils comprising separate conductors arranged in parallel side-by-side relationship and disposed in turns inductively coupled with the winding, whereby the inductive relationship between the winding and one coil is substantially identical to the inductive relationship between the winding and another coil, the turns of one coil being interspersed between the turns of another coil, the turns of said coils being arranged in concentric layers.

JOHN S. SMITH.
FLOYD DAWSON.